J. Barton,
Sleigh-Bell Attachment.
N°10,539.  Patented Feb. 21, 1854.
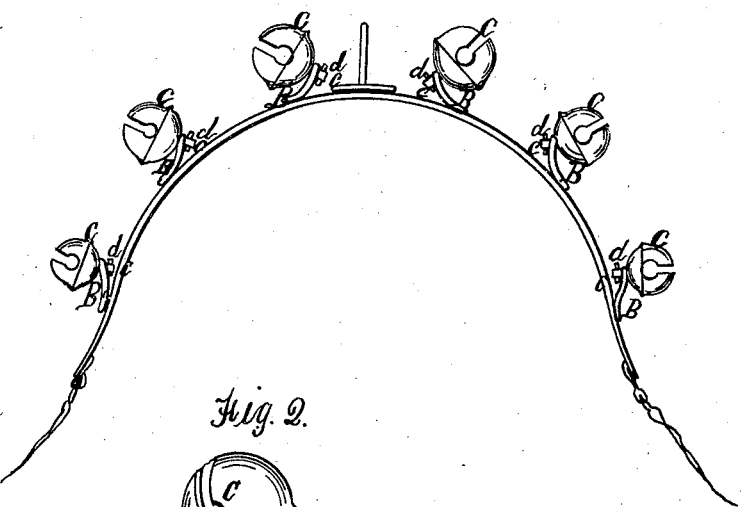
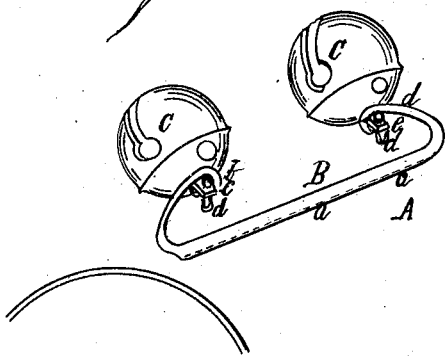

UNITED STATES PATENT OFFICE.

JASON BARTON, OF MIDDLE HADDAM, CONNECTICUT.

MODE OF ATTACHING HORSE-BELLS TO STRAPS.

Specification of Letters Patent No. 10,539, dated February 21, 1854.

*To all whom it may concern:*

Be it known that I, JASON BARTON, of Middle Haddam, in the county of Middlesex and State of Connecticut, have invented a new and Improved Mode of Attaching Horse-Bells to Straps; and I do hereby declare that the following is a full, clear, and exact description of the same, reference being had to the annexed drawings, making a part of this specification, in which—

Figure 1, is a front or end view of a strap with the bells attached thereto according to my improved manner. Fig. 2, is a perspective view of a portion of a strap showing two bells attached to it.

Similar letters of reference indicate corresponding parts in the figures.

The nature of my invention consists in attaching the ordinary spherical horse bells to straps by means of wires or rods secured to the outer surface of the strap. The bells being secured to the ends of the wires or rods which are properly curved or bent. By this arrangement the shanks of the bells are prevented from coming in contact with the horse and thereby any abrasion or galling of the animal is avoided.

In the annexed drawing A represents the strap, and B represents a series of wires or rods attached to the strap by a leather covering, see Fig. 2. The wires or rods being first covered with leather and the leather then stitched to the strap on one side of the wires or rods as shown at (*a*) Fig. 2. When the rows of bells are used as shown in Fig. 2, the wires or rods extend nearly across the strap and each end of every wire or rod is bent upward from the strap and inward, and is provided with an eye or loop (*b*) through which the shanks (*c*) of the bells C pass. The shanks are secured in the eyes by keys (*d*) which pass through holes in the ends of the shanks. In case of a single row of bells being used the parts of the wires or rods that are attached to the strap may be bent in circular form in order that the wires or rods may have a sufficient bearing surface upon the strap. The wires or rods however may be of any form and secured to the strap either by sticking the leather covering to the strap as shown, or by binding the wires or rods to the strap with strong thread or waxed ends. The latter method will answer for cheap straps of bells. I do not confine myself however to any particular mode of securing the wires or rods to the straps. By attaching the bells to the strap in the manner as shown and described there is no possibility of the animal being galled by the shanks of the bells. Bells are now strapped by perforating the strap with holes, and placing the shanks through the holes. This method is far superseded by my improvement, for it matters not how well the strap may be padded in the old method, the shanks will eventually wear the padding and in time gall the animal.

Having thus described my invention, what I claim as new, and desire to secure by Letters Patent, is,

Attaching spherical bells C, to straps, by means of wires or rods B, the bells being attached to the wires or rods as herein shown and described, and the wires or rods secured in any proper manner to the outer side of the strap.

JASON BARTON.

Witnesses:
L. PARMELEE,
NATH. C. SMITH.